US012775867B2

(12) United States Patent
Turner et al.

(10) Patent No.: US 12,775,867 B2
(45) Date of Patent: Oct. 27, 2026

(54) QUANTUM ERROR CORRECTION WITH LEAKAGE

(71) Applicant: Riverlane Ltd, Cambridge (GB)

(72) Inventors: Mark Turner, Cambridge (GB); Matthew Stafford, Bristol (GB); Joan Camps Barjau, Cambridge (GB); Gyorgy Pal Geher, Cambridge (GB)

(73) Assignee: Riverlane Ltd (GB)

( * ) Notice: Subject to any disclaimer, the term of this patent is extended or adjusted under 35 U.S.C. 154(b) by 0 days.

(21) Appl. No.: 19/044,855

(22) Filed: Feb. 4, 2025

(65) Prior Publication Data

US 2025/0328806 A1 Oct. 23, 2025

(30) Foreign Application Priority Data

Feb. 27, 2024 (GB) ...................................... 2402769

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ............................... G06N 10/70; G06N 10/20
See application file for complete search history.

(56) References Cited

U.S. PATENT DOCUMENTS

| | | | | |
|---|---|---|---|---|
| 11,263,076 | B2 * | 3/2022 | Nickerson | G06N 10/70 |
| 11,736,122 | B1 * | 8/2023 | Yoder | H03M 13/1125 714/755 |
| 11,960,970 | B2 * | 4/2024 | Dial | G06N 10/00 |
| 12,596,953 | B2 * | 4/2026 | Senior | G06N 10/40 |
| 2023/0094612 | A1 * | 3/2023 | Chen | G06N 10/00 |
| 2025/0068953 | A1 * | 2/2025 | Senior | G06N 10/40 |

OTHER PUBLICATIONS

†U.S. Appl. No. 19/044,864, filed Feb. 4, 2025, Turner et al.

Das et al., "AFS: Accurate, Fast, and Scalable Error-Decoding for Fault-Tolerant Quantum Computers", 2022 IEEE International Symposium on High-Performance Computer Architecture (HPCA), Apr. 2, 2022, pp. 259-273.

Suchara et al., "Leakage Suppression in the Toric Code", 2015 IEEE International Symposium on Information Theory (ISIT), Hong Kong, China, Jun. 2015, pp. 1119-1123.

Vittal et al., "ERASER: Towards Adaptive Leakage Suppression for Fault-Tolerant Quantum Computing", MICRO '23, Oct. 28-Nov. 1, 2023, Toronto, ON, Canada, In Proceedings of the 56th Annual IEEE/ACM International Symposium on Microarchitecture, Oct. 28, 2023, pp. 509-525.

Search Report and Written Opinion in Application No. GB2402769.0 of Sep. 27, 2024.

* cited by examiner

*Primary Examiner* — Jigar P Patel

(74) *Attorney, Agent, or Firm* — Michael J. Attisha; Greenberg Traurig, LLP

(57) ABSTRACT

A quantum computing system and a method of performing a quantum error correction code are disclosed. A determination is made that a leakage event has occurred at a quantum device. A plurality of decoding hypergraph hyperedges potentially affected by the leakage event are determined. The plurality of decoding hypergraph hyperedges are adjusted in accordance with the leakage event.

23 Claims, 7 Drawing Sheets

QUANTUM ERROR CORRECTION WITH LEAKAGE

CROSS-REFERENCE TO RELATED APPLICATIONS

The present application claims priority under 35 U.S.C. § 119(a) to United Kingdom Patent Application No. GB 2402769.0, filed Feb. 27, 2024, titled "Quantum Error Correction with Leakage," which is hereby incorporated by reference in its entirety.

FIELD OF THE DISCLOSURE

The present disclosure relates to quantum computation.

BACKGROUND

Quantum computers have the potential to perform computations that would be intractable on even the most powerful classical computers.

Instead of representing information using classical bits, quantum computers generally use qubits (quantum bits) that can be in a simultaneous superposition of multiple quantum states. Qubits exhibit much higher error rates than the bits used in classical computers, and quantum computers therefore require the use of quantum error correction in order to identify and correct qubit errors. The inherently delicate nature of quantum states means that quantum error correction is likely to be necessary even once quantum computing technology matures.

Quantum decoding algorithms are employed to process error syndromes and determine likely error occurrences and/or corrections. These algorithms are typically deployed on classical computing hardware with restricted memory and/or processing capabilities. A faster or more accurate decoder will be more effective at determining corrections to physical qubit errors, which will result in lower logical error rates. The decoder is therefore a key element in the overall performance of the quantum computer.

For full quantum advantage to be realised, decoders will have to be capable of rapidly decoding errors in quantum systems that have a large number of qubits, which places onerous runtime requirements on decoder memory and processing capabilities. There is therefore a need for improved decoding methods with reduced decoder runtime processing requirements.

SUMMARY

According to a first aspect of the disclosure, there is provided a quantum computing system comprising: a plurality of quantum devices; and a decoding system comprising memory storing a decoding hypergraph associated with a quantum error correction code, the decoding hypergraph comprising a plurality of nodes connected by hyperedges representing error mechanisms associated with the plurality of quantum devices, wherein the quantum computing system (e.g. the decoding system of the quantum computing system) is configured to: determine that a leakage event has occurred at a quantum device; determine a plurality of decoding hypergraph hyperedges potentially affected by the leakage event; and adjust the plurality of decoding hypergraph hyperedges in accordance with the leakage event.

The decoding system may be configured to: receive syndrome data representative of an error state of the plurality of quantum devices; and determine a correction for the error state by decoding the syndrome data with the decoding hypergraph.

The quantum computing system (e.g. a control system of the quantum computing system) may be further configured to measure a logical state encoded in the quantum devices and apply the correction to the measured logical state.

Determining the plurality of decoding hypergraph hyperedges potentially affected by the leakage event may comprise: determining at least one possible source of the leakage event; and determining one or more quantum operations affected by the at least one possible source of the leakage; identifying a plurality of error mechanisms associated with the one or more quantum operations affected by the at least one possible source of the leakage; and identifying a respective decoding hypergraph hyperedge associated with each of the plurality of error mechanisms.

Determining the plurality of decoding hypergraph hyperedges potentially affected by the leakage event may alternatively comprise: generating a first decoding hypergraph for an error model excluding leakage events; generating a second decoding hypergraph for an error model including leakage events; identifying corresponding hyperedges in the first hypergraph and the second hypergraph that have different edge weights.

Adjusting the plurality of decoding hypergraph hyperedges in accordance with the leakage event may comprise uniformly adjusting the plurality of hypergraph hyperedges.

According to a second aspect of the disclosure, there is provided a computer-implemented method of performing a quantum error correction code at a quantum computing system comprising a plurality of quantum devices, the quantum error correction code having an associated decoding hypergraph comprising a plurality of nodes connected by hyperedges representing error mechanisms associated with the plurality of quantum devices, the method comprising: determining that a leakage event has occurred at a quantum device; determining a plurality of decoding hypergraph hyperedges potentially affected by the leakage event; and adjusting the plurality of decoding hypergraph hyperedges in accordance with the leakage event.

The second aspect of the disclosure provides the same benefits as the first aspect of the disclosure. Any feature described in combination with the first aspect of the disclosure may also be combined with the second aspect of the disclosure.

According to a third aspect of the disclosure, there is provided a computer-readable medium (such as a non-transitory computer readable medium) comprising instructions which, when executed by a quantum computing system, cause the quantum computing system to carry out the method of the second aspect of the disclosure.

BRIEF DESCRIPTION OF THE DRAWINGS

Examples of the present disclosure will now be described in detail with reference to the accompanying drawings, in which.

DETAILED DESCRIPTION

Figure 1:
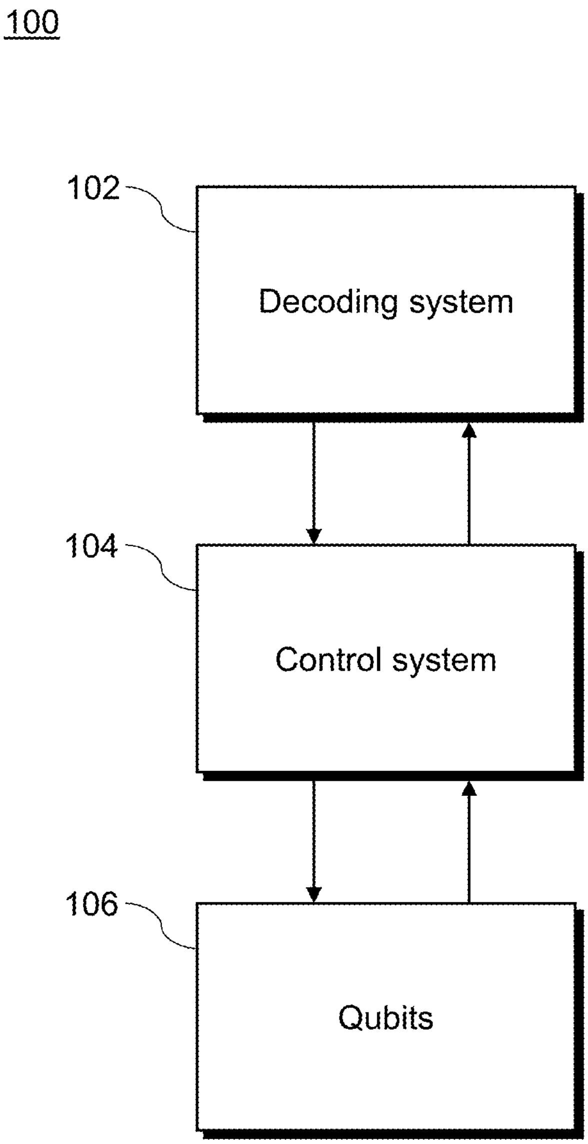
FIG. 1 is a schematic of a quantum computing system.

Quantum error correction (QEC) algorithms are performed to detect and correct errors at the physical qubit level to mitigate against computational errors at the logical qubit level. QEC is expected to be essential for performing useful computations on early quantum computers, and the delicate nature of qubits means that QEC is likely to remain necessary even once quantum computing hardware matures.

The goal of QEC is to reduce the effect of noise within a quantum computer, at least in part by building in redundancies to protect fragile quantum systems. This is achieved with QEC codes that encode a number of logical qubits (one or more) into a larger number of physical qubits. If the error rate of these physical qubits is below a certain threshold associated with the QEC code being used, the logical qubits will exhibit a reduced effective error rate compared to the error rate experienced by the physical qubits. Simply put, each logical qubit can outperform the sum of its parts.

The present disclosure relates to techniques for quantum decoding. By interacting (non-destructively) with the encoded quantum state via auxiliary qubits (i.e. additional physical qubits that do not themselves encode logical states), it is possible to determine the signature of errors that have affected the logical state; this signature is known as the error syndrome, and may also be referred to herein as simply a "syndrome." The process of obtaining this error syndrome, known as syndrome extraction, generally provides only partial information about errors that have affected the logical state. Decoding algorithms may be employed to determine the most likely error occurrences and/or corrections for those errors, based at least in part on the error syndrome. Some decoding algorithms, such as some clustering algorithms, can determine a correction without determining likely error occurrences. Decoding algorithms are typically deployed on classical computing hardware with restricted memory and/or processing capabilities.

The output of a decoder can include a probabilistic prediction. Given the determined syndrome based on interactions with the quantum system, the decoder outputs a best guess for the error that caused it, or alternatively a likely correction that will correct the error. A given family of error correction codes may have a variety of decoding algorithms to choose from; selecting the decoder is a balance between accuracy, speed, and compute budget for decoding. A more accurate decoder will be more effective at producing a best guess for errors/corrections, and this will result in improved logical accuracy of the quantum computation. The decoder is therefore a key element in the performance of the QEC protocol (and therefore the quantum computation as a whole).

The process of encoding and detecting errors using QEC codes ideally utilizes hardware that can receive and process enormous amounts of error information (e.g., syndrome data) in real-time almost instantaneously. For example, a delay in decoding can lead to the creation of a backlog that grows exponentially with the size of the computation, which will ultimately lead to failure of the quantum computation. The speed of the decoder can in some cases act as a bottleneck to the number of qubits in a quantum error correction code (and therefore also as a bottleneck to reducing logical error rates). Improvements to decoding hardware and algorithms help to prevent this backlog, thereby providing for quantum computers with higher numbers of qubits and lower error rates (faster decoders can handle quantum error correction codes involving more data qubits, and using more data qubits leads to a reduction in logical error rates when performing fault-tolerant quantum computation).

Quantum error correction occurs at a low level in the quantum stack, so the benefits of the present disclosure occur at the architecture level of the quantum computer (the error correction occurs at the architecture level and is independent of the data being processed/applications being run) and makes the quantum computer run more efficiently and effectively as a computer (due to reduced logical error rates compared to alternative approaches).

A schematic of an illustrative quantum computing system 100 suitable for performing the method of the present disclosure is shown in FIG. 1. A quantum computing system (also referred to herein as a quantum computer) is a computing system that exploits quantum mechanical phenomena (i.e. using quantum devices) to perform computational operations. The quantum devices may be any quantum devices capable of storing quantum information (i.e., any devices suitable for encoding information using quantum computational states). The quantum devices may be qubits. Alternatively, the quantum devices may be other devices capable of storing quantum information, such as qudits or qutrits. While the description herein will primarily refer to qubits, any reference herein to qubits should be understood to also encompass other types of quantum devices unless explicitly stated otherwise.

The quantum computing system 100 comprises a plurality of physical qubits 106 (unless specified otherwise, reference herein to qubits should be understood to refer to physical qubits rather than logical qubits). The qubits 106 may include data qubits used to encode logical qubit states, and auxiliary qubits (or syndrome qubits) used to perform syndrome measurements for QEC. These different types of qubits may differ only in the way that their states are manipulated and interpreted; that is, the data qubits and auxiliary qubits may be physically implemented in the exact same way in some embodiments, and only differ in their usage.

While the illustrative quantum computing system 100 uses qubits 106, one skilled in the art will appreciate that the techniques described herein are also applicable to quantum computing systems that use other quantum devices, such as qutrits and qudits. Accordingly, it should be understood that any reference herein to qubits is applicable to any type of quantum devices that can be used to encode quantum information.

As described above, qubits are quantum devices, such as a multi-level quantum device, capable of storing quantum information (i.e. any devices suitable for encoding information using quantum states). The quantum states of the qubit may for instance include electronic states, polarization states, vibrational states, rotational states, or spin states. For example, the qubits 106 may be superconducting qubits, neutral atom qubits or any other type of qubit. In some cases, a qubit may be a logical qubit formed from multiple physical qubits, such as a superconducting resonator coupled to an ancilla superconducting charge qubit.

In the case of superconducting qubits, quantum information may be represented by the presence or absence of an electronic charge (e.g. the presence of absence of a Cooper-pair, which is a pair of bound electrons). The quantum state of a superconducting qubit can be manipulated through the application of shaped microwave pulses, which can effect operations such as quantum logic gates and state readout.

In the case of neutral atom qubits, quantum information may be represented by occupation of different electron energy levels. For example, a first energy level (e.g. the ground state or some excited state) may represent a first quantum state, and a different energy level may represent a different quantum state. The quantum state of a neutral atom qubit can be manipulated through the application of laser pulses, whereby the frequency and duration of the pulse can be carefully controlled to cause transitions between select energy levels. Neutral atom qubits can be measured by detecting photon emission (i.e. electromagnetic radiation, which may be in the visible spectrum) when the atom is irradiated with suitable laser pulses.

Unlike classical bits (which can be in either a zero or one state), qubits exploit the phenomenon of quantum superposition in order to enable them to exist in multiple states at once. Quantum superposition allows a quantum mechanical system to simultaneously occupy multiple different states; only when the state of the system is observed/measured does the system "collapse" into a single definite state.

For example, a quantum zero state (denoted $|0\rangle$) may correspond to the absence of a Cooper pair (in the case of superconducting qubits) or occupation of a first electron energy level (in the case of neutral atom qubits), and a quantum one state (denoted $|1\rangle$) may correspond to the presence of a Cooper pair or occupation of a second energy level. Quantum mechanics allows qubits to simultaneously be in a combination of the $|0\rangle$ and $|1\rangle$ states until they are observed (at which point they "collapse" into a single state).

This combination of the $|0\rangle$ and $|1\rangle$ basis states for a single qubit may be represented as a quantum wavefunction $|\psi\rangle=\alpha|0\rangle+\beta|1\rangle$, where $|\psi\rangle$ represents the qubit state and a and B represent the amplitudes of the $|0\rangle$ and $|1\rangle$ states respectively. The amplitudes may be positive or negative, and they may have complex components. Conceptually, a single qubit state can be visualized as a position on a unit sphere known as a "Bloch sphere". Some qubits can also be controlled to be in other states, such as higher or lower energy states than the $|0\rangle$ and $|1\rangle$ basis states, for the purposes of computation, such as the Rydberg state in neutral atoms, described below.

In addition to superposition, qubits can also exploit the phenomenon of quantum entanglement, which allows the states of different (potentially spatially separated) quantum mechanical systems to become dependent upon one another. For example, when a first and a second quantum mechanical system are entangled, observation/measurement of one of the systems may cause the other to instantaneously collapse into a state dependent upon the outcome of said observation/measurement. Entanglement between qubits can be realised by applying control signals (e.g. microwave or laser pulses) to a qubit in such a way that the effect upon that qubit is dependent upon the state of one or more other qubits.

In the example of neutral atoms, qubits can be entangled by making use of the "Rydberg blockade" effect in physics. An atom is temporarily excited into a higher Rydberg energy level; it becomes entangled because no other atom in the vicinity can be in the same higher Rydberg energy level.

While there are several different (and equivalent) models of quantum computation, the most prominent model is the circuit model, in which quantum computations are described using quantum logic circuits that are similar to logic circuits used in classical (i.e. non-quantum) computation.

For example, quantum circuit operations include (among others) an X (or NOT) gate, which flips a $|0\rangle$ state to a $|1\rangle$ state (and vice-versa), a Z (or phase) gate (which flips the sign of the amplitude of the $|1\rangle$ state), and a CNOT (or controlled-NOT) gate, which performs an X gate on a target qubit dependent upon a control qubit being in a $|1\rangle$ state. As one skilled in the art will appreciate, the CNOT gate can be used to entangle qubits when the control qubit is in a superposition of the $|0\rangle$ and $|1\rangle$ states (conceptually, the CNOT gate is activated by the part of the superposition that is in the $|1\rangle$ state but not by the part of the superposition that is in the $|0\rangle$ state, so the state of the target qubit becomes dependent upon the state of the control qubit).

Because the amplitudes of quantum states can be non-integer values, the number of possible quantum states is unrestricted (i.e. infinite). As such, quantum gates are similarly not restricted to analogues of classical logic operations. Instead, quantum gates can perform arbitrary manipulations of the quantum state, which can be visualised as rotations of the quantum state in the Bloch sphere picture. A quantum gate may therefore be any unitary operation. In practice, arbitrary unitary operations may be approximated by using a finite set of logic gates (e.g. a group of quantum operations known as the "Clifford group" in combination with one other gate that is not an element of the Clifford group). Furthermore, these operations may be performed on groups of physical qubits that encode "logical qubits" as part of an error correction code.

Quantum logic gates may conveniently be represented as matrices, and quantum states may be represented as vectors (normally column vectors).

For example, a quantum state $|\psi\rangle=\alpha|0\rangle+\beta|1\rangle$ may be represented as:

$$|\psi\rangle=\begin{pmatrix}\alpha\\ \beta\end{pmatrix}.$$

X, Z and CNOT gates may be represented as:

$$X=\begin{pmatrix}0&1\\1&0\end{pmatrix},\ Z=\begin{pmatrix}1&0\\0&-1\end{pmatrix}\text{ and }CNOT=\begin{pmatrix}1&0&0&0\\0&1&0&0\\0&0&0&1\\0&0&1&0\end{pmatrix},$$

where the CNOT gate acts upon two quantum states, which can be represented as a stacked column vector.

In general, quantum computing operations can be represented in as a unitary operation in a matrix form (i.e., as a unitary matrix). In some cases, quantum computing may also comprise the application of non-unitary operations (e.g., transitioning from a basis state to a Rydberg state in a neutral atom qubit).

Quantum logic gates can be implemented on physical qubits by applying control pulses (e.g. microwave or laser pulses, depending upon the qubit architecture). In addition to the logic gates described above, other quantum computing operations include state initialisation (i.e. preparing qubits in an initial state, such as a $|0\rangle$ state) and state measurement (e.g. measuring whether a qubit is in a $|0\rangle$ or $|1\rangle$ state—as discussed above, a qubit may be in a superposition of both of these states and collapses into one state when it is measured).

Quantum logic gates cannot be efficiently simulated by a classical computer, which means that quantum computers can perform calculations that would be infeasible on classical computers. For example, the behaviour of quantum mechanical systems can be described by unitary matrices, so quantum computers can simulate these quantum mechanical systems by decomposing these unitary matrices into quantum logic gates that can be performed on the quantum computer. This allows quantum computers to determine molecular properties (such as energy levels) and has applications in areas such as materials development and drug discovery. The output of a quantum computation (e.g. the result of the computation/calculation) is determined by measuring the qubits; when simulating quantum mechanical systems, this measurement may encode a physical parameter, such as an energy level or similar. Quantum computers also have applications outside of quantum simulations, such as factoring numbers (which can be used to decipher encrypted information).

In the example of FIG. 1, the qubits 106 are controlled by a control system 104 having one or more classical processors. The control system 104 transmits control signals (e.g. RF pulses) to the qubits 106 for performing operations on the qubits 106 (including measurement operations) and receives measurement information from the qubits 106. The measurement information will generally be analogue data signals, although the analogue signals may alternatively be converted to digital signals before being transmitted to the control system 104 in some implementations (e.g. the qubits 106 may be provided with one or more analogue to digital converters).

The control system 104 may receive high-level instructions from an algorithmic system or similar (not shown) and convert these high-level instructions (such as logic gates) into low-level qubit instructions (e.g. microwave pulses etc.), which may be in analogue format.

The quantum computing system 100 also comprises a decoding system 102 (also referred to herein as a decoder). The decoding system 102, which is generally a classical computing system, receives an error syndrome (also referred to as syndrome data) obtained from measurements of syndrome qubits. The error syndrome may comprise raw analogue measurement data, or it may alternatively be pre-processed (e.g. into digital format) by the control system 104. The decoding system 102 may be connected to the control system 104 and receive the error syndrome via the control system 104 as illustrated in FIG. 1 (potentially via one or more additional intermediary systems), or in alternative examples the decoding system 102 may be connected directly to the qubits 106 and receive the error syndrome from the qubits 106 (e.g. as raw analogue signals or digital measurement values). The decoding system 102 uses a decoding process/algorithm to decode the error syndrome to determine a correction for an error state of the qubits 106 associated with the error syndrome (i.e. an error state that causes the measured error syndrome). The decoding system decodes syndromes and provides one or both of (i) possible error locations (e.g. which data qubits may have experienced an error), and (ii) a correction for the qubit error state. It is possible to determine a correction during decoding without determining error locations, and the correction may be a single bit representing whether a logical error has occurred. The correction can generally be tracked by a classical computer (e.g. by the decoder or a control system) and does not generally need to be applied to the quantum devices. The decoder may be a dedicated hardware device (e.g. implemented using an FPGA or ASIC or similar) or it may be a software component implemented using a CPU.

A syndrome (also referred to as syndrome data) is a collection of values (e.g. measurement values, generally based on qubit measurements, in particular syndrome qubit measurement) representative of an error state of physical data qubits in the quantum computer. The syndrome may also include decoding hypergraph location information for each syndrome value—e.g. a coordinate or index value. Syndrome data may be obtained by measuring a plurality of syndrome qubits (e.g. surface code stabiliser measurements). The decoder may receive the syndrome data as raw (e.g. analogue) measurement data, or the syndrome data may be pre-processed (e.g. processed into digital form by a control system). The syndrome data may also comprise additional data, such as a bitstring (or similar) describing whether each quantum device is in a leaked or unleaked state.

In more detail, QEC codes may involve obtaining measurement values for stabilisers, which are quantum operators that act on sets of physical data qubits of the QEC code and provide information about the collective error state of that set of qubits (e.g., the stabiliser measurement value may act as a parity check indicating whether an odd or even number of data qubits in the set of physical data qubits are affected by a certain type of error).

Stabiliser values may be obtained by performing entangling operations between physical auxiliary qubits (often referred to as syndrome qubits) and the set of physical data qubits. The stabiliser values become encoded in the quantum state of the syndrome qubit as a result of the entangling operations, and the stabiliser measurement values can then be obtained by measuring the syndrome qubits. In this way, error information can be inferred without directly measuring the physical data qubits (which would cause logical quantum states encoded in the QEC code to collapse, thereby negating any quantum mechanical effects).

In other words, the syndrome may be obtained by measuring syndrome qubits to obtain stabiliser values. The collection of stabiliser values may itself be used as the syndrome. Alternatively, when performing multiple rounds of error correction, the syndrome may instead indicate changes in stabiliser values between successive rounds of stabiliser measurements (e.g., classically processing the stabiliser values by taking the XOR value of successive measurement values); this is because the decoder is generally interested in changes in the error state.

In addition, the syndrome may be provided with additional "soft" information indicative of stabiliser measurement confidence values. In general, there is uncertainty associated with measurement of a quantum mechanical system (such as a qubit). This uncertainty (e.g., a probability) can be used to enhance the decoding process, and is commonly referred to as soft information.

The syndrome information may therefore comprise at least one of (i) stabiliser measurement values obtained from measurement of syndrome qubits (e.g., a list 0 and 1 values representing the $|0\rangle$ and $|1\rangle$ states of the syndrome qubits), and (ii) a list of stabiliser values that have changed from the previous round of QEC (e.g., the result of performing an XOR operation between successive rounds of syndrome measurement values). This may optionally be supplemented with soft information (e.g., probability values) indicating confidence values associated with the stabiliser measurement values.

One skilled in the art will appreciate that the quantum computing system 100 may also comprise additional intermediary components positioned between the illustrated components, and that the illustrated components may be connected in a different configuration (e.g. the decoding system 102 may be connected directly to the qubits 106 as previously described). Moreover, the decoding system 102 and the control system 104 may be implemented in any suitable combination of hardware and/or software components. For example, the control system 104 may be implemented at least in part using one or more digital logic controllers, and the decoding system 102 may be implemented at least in part using a general-purpose processor executing software.

Figure 2:
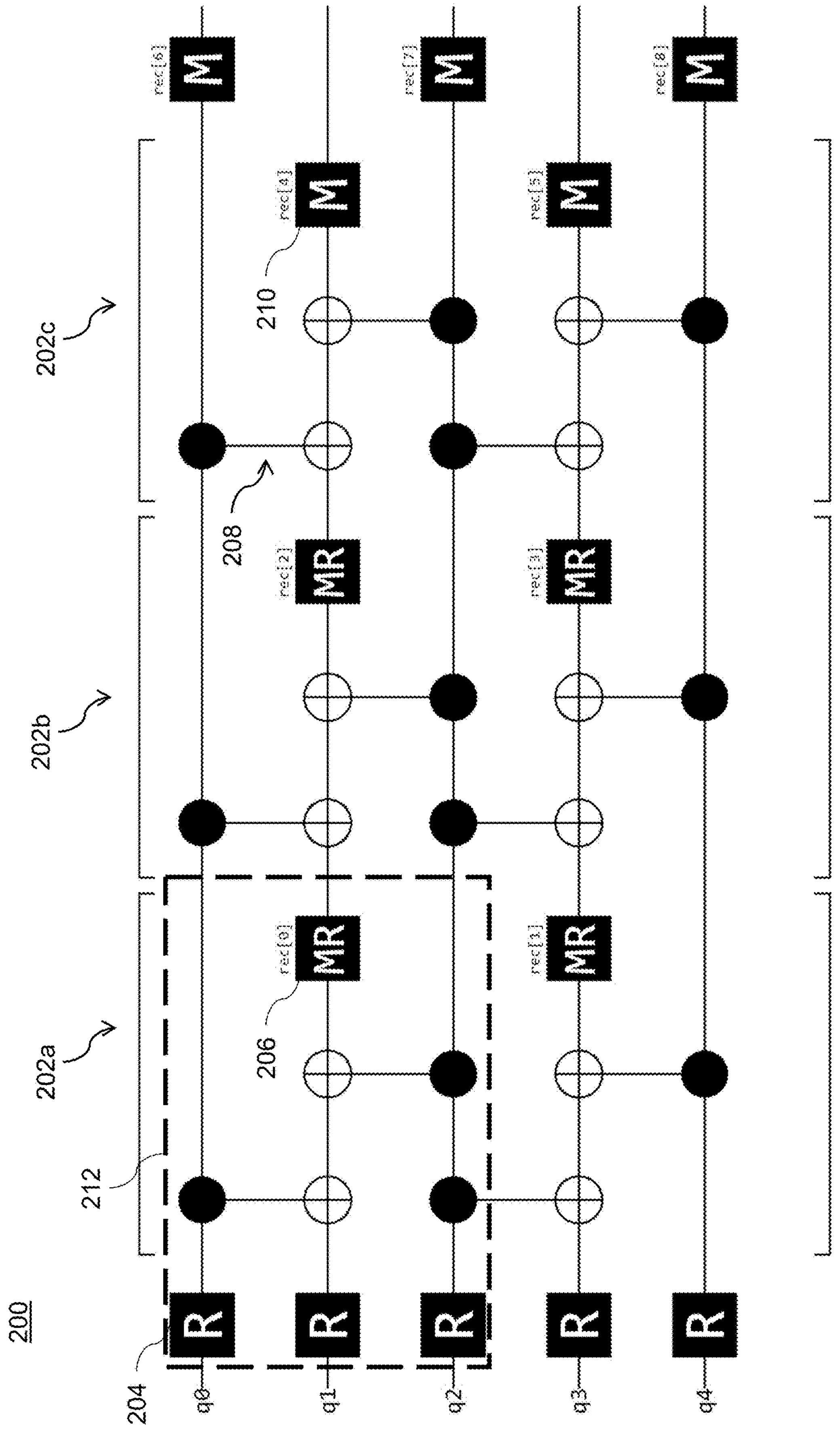
FIG. 2 show a syndrome extraction circuit.

As stated above, QEC generally involves obtaining an error syndrome and implementing a decoding algorithm on a hardware or software decoder to identify errors and/or corrections. FIG. 2 shows an example of a quantum circuit 200 that can be executed to obtain an error syndrome for three data qubits encoding a single logical qubit; this circuit 200 may be referred to as a syndrome extraction circuit 200. The illustrated circuit 200 can be executed to detect and correct Pauli X errors (i.e. bit-flip errors) on the data qubits and provides a simple example of syndrome extraction for the purpose of the present disclosure. One skilled in the art will appreciate that other types of error, such as Pauli Z errors (i.e. phase-flip errors) and Pauli Y errors (combined bit-flip and phase-flip errors), can be protected using more complex syndrome extraction circuits and that the present disclosure can also be used in combination with such syndrome extraction circuits (e.g. surface code syndrome extraction and error correction). For example, the circuit 200 may be executed by the control system 104 on one or more of the qubits 106.

The illustrated syndrome extraction circuit 200 uses standard quantum circuit notation; horizontal lines represent individual qubits (labelled q0-q4) and time progresses from left to right (i.e. the leftmost operations are performed before the rightmost operations, although one skilled in the art will appreciate that the order of certain operations can be changed and that some operations can be performed simultaneously even when not horizontally aligned in the circuit diagram).

Qubits q0, q2 and a4 are data qubits that are controlled to encode the logical qubit state in the states of these qubits, and qubits q1 and q3 are syndrome qubits (which may also be referred to as auxiliary qubits or similar) from which error information about the data qubits can be inferred through suitable interactions with the data qubits. In the illustrated syndrome extraction circuit 200, Pauli X errors on qubits q0 or q2 affect (e.g. flip from 0 to 1 or vice-versa) the state of syndrome qubit q1, and Pauli X errors on qubits q2 or q4 affect the state of syndrome qubit q3.

The illustrated circuit involves three rounds 202*a-c* of syndrome extraction performed by measuring the syndrome qubits q1, q3, followed by a further syndrome extraction performed by measuring the data qubits q0, q2, q4 directly; data qubits can only be measured in this manner at the end of a quantum error correction procedure (e.g. when measuring the logical state) because doing so collapses the quantum state of the qubits.

Reset operations 204, labelled R, act to prepare the qubits q0-q4 in known states (e.g. $|0\rangle$ states). Measurement reset operations 206, labelled MR, act to measure the state of a qubit and reset it to a known state (e.g. $|0\rangle$ state), and non-reset measurement operations 210, labelled M, measure the qubits without resetting them to a known state. The illustrated syndrome extraction circuit uses controlled-NOT (CNOT) gates 208 to perform two-qubit entangling operations between the data qubits and syndrome qubits.

Many QEC schemes utilise a decoding graph when decoding error syndromes. A decoding graph is a graph comprising edges representing error mechanisms and nodes representing syndrome measurement outcomes or differences between successive syndrome measurements. The syndrome data does not provide the exact location of errors, but it instead provides information that can be used to infer likely errors and/or corrections. For example, the syndrome data may indicate end points of strings/chains of errors. Non-trivial syndrome values (e.g. changes in value between successive syndrome measurements) are referred to as defects, excitations or measurement events; the location of these defects in the decoding graph acts as a (generally non-unique) symptom of the underlying qubit errors (e.g. errors in the data and syndrome qubits). A defect (also referred to as an excitation or measurement event) generally represents the end of a chain (or hyperchain) of errors in the decoding hypergraph (the chain of errors may span both space-like and time-like dimensions of the decoding hypergraph). Defects are non-trivial syndrome values, and they may correspond to a change in value of a syndrome qubit measurement outcome between successive rounds of syndrome measurement.

Decoding the syndrome data using a decoding graph generally involves grouping these defects. Examples of decoding algorithms include minimum-weight-perfect-matching, union find and collision clustering. Such decoding algorithms are common general knowledge to one skilled in the art, and any suitable decoding algorithm (e.g. any decoding algorithm that utilises a decoding graph or hypergraph) can be used in combination with the present disclosure to determine corrections with a decoding graph.

The concept of decoding graphs can be extended more generally to hypergraphs, in which edges can be connected to more than two nodes (graphs are a specific type of hypergraph in which each edge connects to two nodes). A hypergraph is a generalisation of a graph in which edges ("hyperedges") can be connected to more than two nodes. The methods of the present disclosure apply equally to decoding hypergraphs. Accordingly, any reference herein to graphs or edges (including, but not limited to, decoding graphs and edges) should be understood to also encompass hypergraphs and hyperedges (including, but not limited to, decoding hypergraphs and hyperedges), respectively.

Decoding hypergraphs (especially decoding graphs) may be used in error correction codes (such as topological error correction codes including the surface code) to facilitate decoding of the syndrome by pairing (or grouping) "defects" in the syndrome (these defects generally provide an indication of end points of chains (or hyperchains) of errors on physical data qubits in the error correction code).

A decoding hypergraph is a hypergraph (in the mathematical sense) comprising hyperedges representing error mechanisms, and nodes (or vertices) representing differences in successive syndrome measurements (or more generally, a decoding hypergraph comprises nodes representing detectors, which are measurement results that sum to zero (e.g. modulo 2 sum) during perfect (i.e. error-free) operation of the quantum computing system), such as parity measurement results. The decoding hypergraph may have one or more boundaries, which involve hyperedges extending beyond the hypergraph (e.g. to one or more virtual boundary nodes), i.e. the decoding hypergraph may be a sub-hypergraph of a larger hypergraph including the virtual boundary node(s)). Conventionally, some error correction literature has referred to "rough" boundaries and "smooth boundaries". However, the "smooth" boundaries in such literature are not actually boundaries in the above sense, and they will not be referred to as boundaries in the present disclosure. Accordingly, the boundaries referred to herein are synonymous with the "rough" boundaries in such literature.

Figure 3:
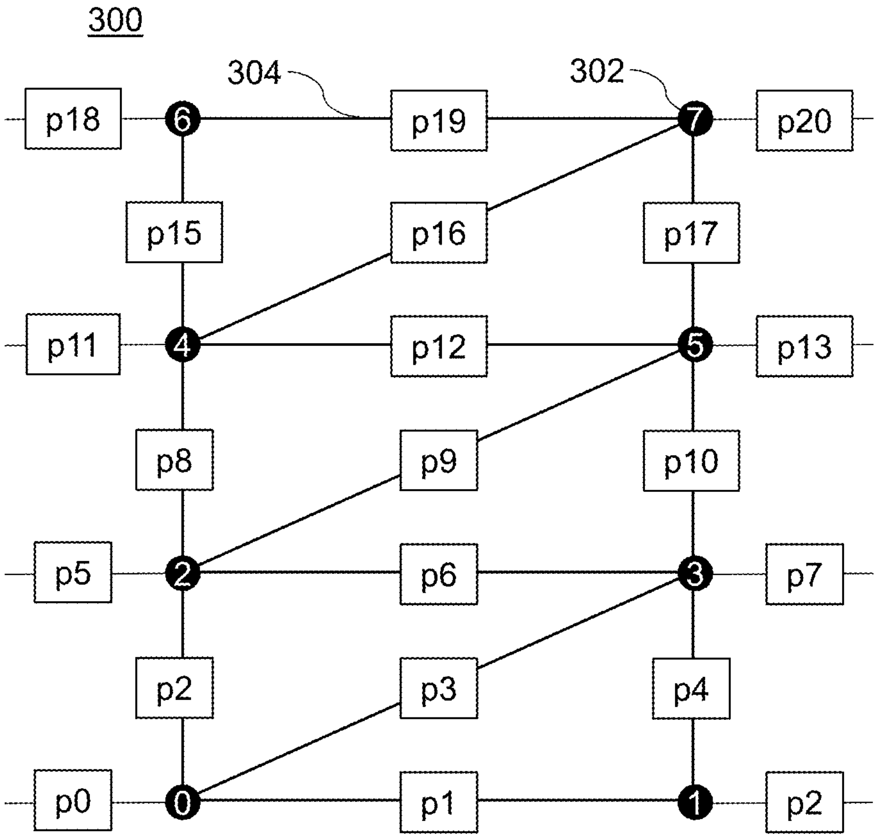
FIG. 3 shows a decoding graph.

FIG. 3 shows an illustrative decoding graph 300 for the syndrome extraction circuit 200 of FIG. 2. The decoding graph 300 comprises, or consists of, nodes 302 (labelled 0 to 7) connected by edges 304. Each edge 304 has an associated edge weight, labelled po to p20. The edge weights may be associated with the probabilities of the error mechanisms represented by each edge 304 (i.e. lower weight edges are associated with higher error probabilities).

The nodes 302 labelled 0 and 1 are associated with the measurements of the syndrome qubits q1 and q3 respectively in the first round 202*a* of syndrome extraction. Assuming all qubits are initially prepared in a |0⟩ state, the error-free state of these measurements will both be 0. Nodes 2 and 3 are associated with the measurements of the syndrome qubits q1 and q3 respectively in the second round 202*b* of syndrome extraction, and nodes 4 and 5 are similarly associated with the measurements of the syndrome qubits q1 and q3 respectively in the third round 202*c* of syndrome extraction (one skilled in the art will appreciate that the nodes may actually be associated with a joint parity/change in measurement value between successive measurements of the syndrome qubits). Node 6 is associated with the measurement outcomes of data qubits q0 and q2 in the final round of syndrome extraction, and node 7 is associated with the measurement outcomes of data qubits q2 and q4 in the final round of syndrome extraction.

Generally speaking, vertical edges 304 of the decoding graph 300 represent error mechanisms affecting the syndrome qubits, horizontal edges 304 represent error mechanisms affecting data qubits in a single round of syndrome extraction, and diagonal edges 304 represent mid-circuit error mechanisms on the data qubits (these errors can arise due to the order of the gates in the syndrome extraction circuit 200).

Decoding graph structures and edge weights, such as the illustrative graph 300 and the edge weights of the edges 304, can be determined using various methods. One approach is to decide upon an error model (e.g. a depolarising error probability associated with each gate in a syndrome extraction circuit) and identify which node(s) would be affected by an error at each location in the syndrome extraction circuit. An edge is added to the decoding graph between any two nodes that are affected by an error, and the weight of the edge is generally inversely proportional to the total error probability associated with that edge (e.g. inversely proportional to the combined error probability for all errors mechanisms related to that edge). For example, if there are two possible errors that affect the same pair of qubits, the total probability of an error for the associated decoding graph edge can be determined by combining the error probabilities, with the inverse of this value being used as the edge weight. One skilled in the art will appreciate that scaling all edges in a decoding graph by the same scale factor does not generally affect the decoding outcome, so the edge weights do not have to be exactly equal to the inverse of the error probabilities.

Alternatively, edge weights may be determined empirically, e.g. by using experimental data to estimate error probabilities associated with each possible edge of a decoding graph.

The illustrated decoding graph has some edges 304 that only connect to a single node; these edges represent boundaries of the decoding graph. The boundaries can conceptually be considered to all connect to one or more virtual nodes/boundary nodes. One skilled in the art will appreciate that the nuances of the decoding graph will depend upon the error correction code being implemented, and that some decoding graphs (e.g. those for toric codes) do not have boundaries. The concept of boundaries can be extended to hyperedges, in which hyperedges at a boundary may connect to a virtual node in addition to one or more nodes of the decoding hypergraph.

Conventional decoding algorithms primarily focus on error mechanisms that leave qubits in a computational basis state (e.g. some superposition of the |0⟩ and |1⟩ states), such as bit-flip and phase-flip errors; such error mechanisms can be modelled using noise channels such as depolarising noise. However, it is also possible for other types of error to occur that leave qubits in non-computational states (e.g. a |2⟩ state or similar). Such errors are referred to as leakage errors, because they cause the qubit to leak into a non-computational basis-state. In the present disclosure, the term "leakage" will be used to refer to any unintentional or otherwise unexpected occupation of non-computational basis states by quantum devices.

Unlike depolarising errors, leakage errors can often be detected directly (i.e. decoding is not necessarily required to determine which qubits are affected by leakage). For example, leakage on the syndrome qubits q1, q3 in the syndrome extraction circuit 200 of FIG. 2 can be detected during the measurement operations (the term "measurement operations" should be understood to include both reset measurement operations and non-reset measurement operations unless explicitly stated otherwise).

In general, leakage detection events (also referred to as heralded leakage) only inform that leakage has occurred: they do not inform exactly when it occurred. Whenever a leaked qubit interacts with other qubits (e.g. via a CNOT gate) it has the potential to cause undefined behaviour that may increase error rates on the other qubits; leakage events can therefore be extremely damaging to quantum error correction codes. As such, the detection of leakage affects the probabilities of different error mechanisms, which in turn affects decoding graph edge (or decoding hypergraph hyperedge) weights. In particular, these error mechanisms have a relatively high probability, meaning that the associated decoding graph edges (or decoding hypergraph hyperedges) are of relatively low weight and are sharply differentiated from other edges (or hyperedges) in the graph (or hypergraph) that typically represent relatively improbable (high weight) error mechanisms.

Figure 4:
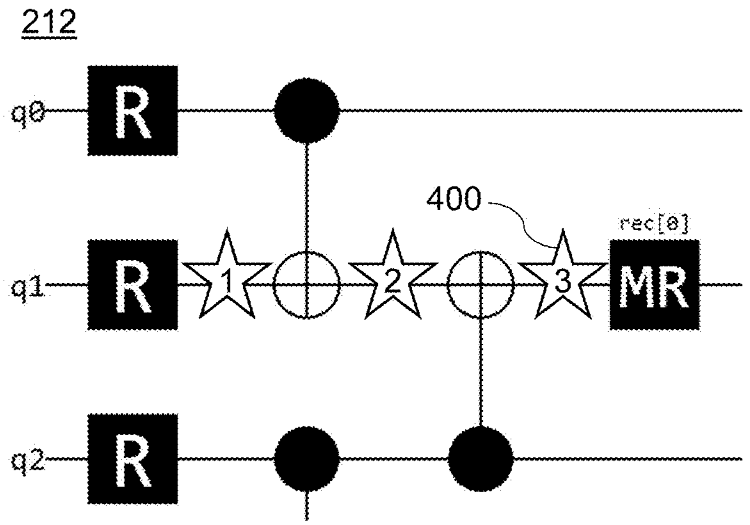
FIG. 4 shows part of the syndrome extraction circuit experiencing leakage.

As an example, consider the subset of syndrome extraction operations enclosed in the dashed box 212 of FIG. 2. This subset includes a measurement reset operation 206, which may be used to detect the occurrence of leakage on the syndrome qubit q1. However, if leakage is detected, there are three distinct regions of the syndrome extraction circuit during which it may have occurred, as illustrated in FIG. 4. The first possibility is that the syndrome qubit q1 leaked at some point between the initial reset operation and the first CNOT gate; this first region is indicated with the star 400 labelled 1 in FIG. 4. The second possibility is that the syndrome qubit q1 leaked at some point between the first CNOT gate and the second CNOT gate, this second region is indicated with the star 400 labelled 2. Alternatively, the syndrome qubit q1 may have leaked after the second CNOT gate; this third region is indicated with the star 400 labelled 3.

For the purpose of the present disclosure, it will be assumed that the probability of leakage occurring in the first region is 0.1% and that the probability of leakage occurring in the second and third regions is 0.2% for each region (one skilled in the art will appreciate that actual error probabilities, including leakage error probabilities, will vary depending upon the error model, operations and hardware in question and can be determined using various analytic, numerical and empirical methods). Using these error rates and the knowledge that the qubit leaked during one of these it can be inferred that the likelihood that the syndrome qubit leaked by the end of the first region was 0.2, the probability that the leakage occurred by the end of the second region was 0.6, and the probability that the leakage occurred by the end of the third region was 1.0.

As discussed above, leaked qubits have the potential to affect error rates of other qubits. In the following disclosure, it will be assumed that any qubit that interacts with a leaked qubit experiences depolarising errors with probability 1 (i.e. either an I, X, Y or Z operation is applied to the qubit with equal probability 0.25—depolarising errors essentially randomise the error state of the qubit). However, one skilled in the art will appreciate that alternative leakage error models may also be used with the methods disclosed herein.

Figure 5:
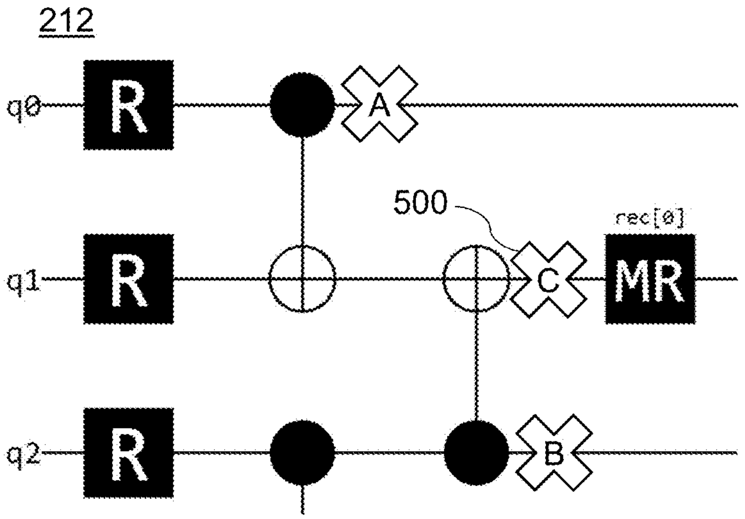
FIG. 5 shows potential errors caused by leakage in the part of the syndrome extraction circuit.

Accordingly, for the circuit shown in FIG. 4, leakage on the syndrome qubit q1 is modelled as causing a depolarising error on data qubit q0 if the leakage occurs in the first region (probability 0.2)—this error is indicated by the cross 500 labelled A in FIG. 5. Leakage in the first or second regions is modelled as causing a depolarising error on the data qubit q2 with probability 0.6, as indicated by the cross 500 labelled B in FIG. 5. Leakage in any region can be modelled as a depolarising error on the syndrome qubit q1 with probability 1 as indicated by the cross 500 labelled C in FIG. 5, although one skilled in the art will appreciate that in practice leakage errors are distinct from depolarising errors.

Figure 6:
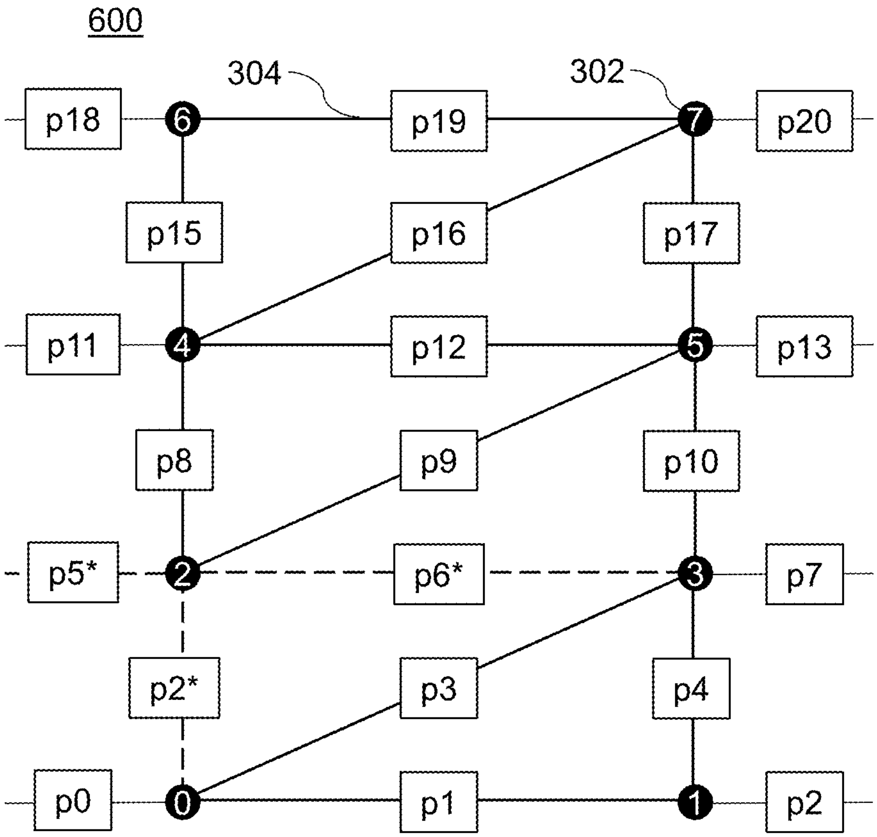
FIG. 6 shows a modified decoding graph.

The consequence of these additional depolarising errors is to affect the error probabilities associated with different error mechanisms (i.e. edges) on the decoding graph. In particular, the additional depolarising errors shown in FIG. 5 affect the probabilities of error mechanisms associated with three edges of the decoding graph 300 of FIG. 3, as shown by the dashed lines of the updated decoding graph 600 shown in FIG. 6. In the updated decoding graph 600, edge weights p2, p5 and p6 have been replaced with new edge weights p2*, p5* and p6* to reflect the changes in the probabilities of the error mechanisms associated with these edges.

It is possible to calculate exact weights for the edges affected by the leakage using the methods described above. However, it is often impractical to calculate and implement exact edge weight adjustments at runtime. In addition, the existing decoding graph weights capture the error probabilities accurately for edges that are not affected by leakage, so calculating or generating a completely new decoding graph may be unnecessary.

Instead of using exact edge weights in response to leakage detection events, the weights associated with edges affected by leakage can be set to zero while maintaining high decoding accuracy. In other words, the edge weights p2*, p5* and p6* can be set to zero and all other edge weights left unaffected.

Alternative adjustments may also be used instead of setting the edge weights to zero. For example, the edge weights may be set to some other predetermined weight value that is low compared to other edge weights in the decoding graph.

Alternatively, an adjustment may be made using an error flag or mask. For example, a bit may be used as an error flag (e.g. a leakage error flag) to indicate that an edge is associated with a leakage event and/or has an increased error probability (the error flag may be stored in hyperedge data in the decoding hypergraph). Setting a mask for each edge may involve adding the edge to a mask data structure (e.g. a list) indicating edges that are associated with leakage events and/or have increased error probabilities. The error flag or mask may indicate that the edge should be included in a cluster/pre-cluster or pre-grown (e.g. for use by the decoding system when determining a correction using a clustering algorithm).

Compared to using exact edge weights, this approach has several advantages. Firstly, unlike existing approaches to leakage, which generally involve calculating the exact effect that leakage has upon error rates associated with different error mechanisms, the approach disclosed herein avoids the need to perform complex recalculations of decoding hypergraph hyperedge weights. The approach disclosed herein also reduces space/memory overhead compared to existing approaches because there is no need to store a weight for each hyperedge that is potentially affected by a given leakage event (a flag, list or mask can be used instead). Furthermore, unlike existing approaches, the approach disclosed herein is applicable in the context of unweighted decoders. When implemented using pre-clustering or pre-growing, the approach disclosed herein also avoids the need to buffer hyperedges that are affected by leakage events to reverse hypergraph modifications after each decoding cycle. These benefits make the techniques described herein especially well-suited to implementation in dedicated decoding hardware, which often has limited processing and/or memory capabilities.

As such, by improving runtime speed, the present disclosure may provide for the use of QEC codes with higher qubit numbers and improved logical fidelity (e.g., the present disclosure may reduce noise in practical scenarios compared to other approaches).

Compared to decoding approaches in which edges are not modified, the present approach increases logical fidelities (i.e. reduces noise) by multiple orders of magnitude. Accordingly, the present disclosure reduces logical error rates when performing quantum error correction on a quantum computer.

Figure 7:
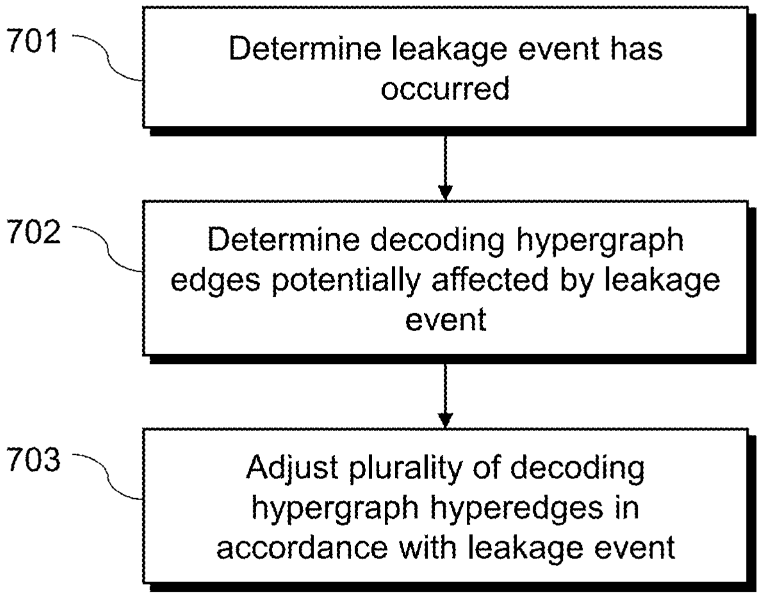
FIG. 7 shows a flowchart for a method of performing a quantum error correction code.

FIG. 7 shows a flowchart of a method for performing quantum error correction with leakage errors. The method of FIG. 7 may be performed by a suitable computing system, such as the decoding system 102 described above in relation to FIG. 1. In step 701 of the method shown in FIG. 7, it is determined that a leakage event (e.g. a leakage error) has occurred at a quantum device (e.g. a qubit, such as one of the qubits 106). The leakage event may be detected during syndrome measurement by the computing system performing the method of FIG. 7 of the quantum device, or it may be detected at some other point during a quantum computation, e.g. a dedicated leakage detection operation. Leakage may be detected on any quantum device and is not limited to syndrome qubits (for example, leakage may also be detected on data qubits). Determining that a leakage event has occurred at a quantum device may involve directly detecting the leakage (e.g. by observing occupation of non-computational basis states) or indirectly (e.g. by observing unusual behaviour in nearby/connected quantum devices).

In step 702, the computing system performing the method of FIG. 7 determines decoding hypergraph hyperedges (e.g., graph edges) potentially affected by the leakage event. A hyperedge (e.g., edge) is potentially affected by a leakage event if the leakage event increases the likelihood of the error mechanism represented by the hyperedge (in other words, a hyperedge is potentially affected by a leakage event if a probability of an error mechanism represented by that hyperedge changes (e.g., increases) as a consequence of the leakage event having occurred). Various methods may be used to identify hyperedges potentially affected by the leakage event. For example, qubits that interact with a leaked qubit can be identified (e.g. using a syndrome extraction circuit) and/or new decoding hypergraph hyperedge weights can be calculated (e.g. in the vicinity of the leakage) and compared to the original values (any hyperedge for which the hyperedge weight decreases can be identified as affected by the leakage).

In one example, determining the decoding hypergraph hyperedges (e.g., graph edges) potentially affected by leakage may involve determining at least one possible source of the leakage event, determining one or more quantum operations affected by the at least one possible source of the leakage (e.g. any quantum operations that involve a qubit that would be in a leaked state as a consequence of the possible source of the leakage), identifying error mechanisms associated with the determined quantum operations and identifying the decoding hypergraph hyperedges (e.g., graph edges) associated with the identified error mechanisms.

In an alternative example, determining the decoding hypergraph hyperedges (e.g., graph edges) potentially affected by leakage may involve generating a first decoding for a first error model (e.g. depolarising error channels or phenomenological noise model) excluding leakage events, generating a second decoding hypergraph (e.g., a second decoding graph) for a second error model including leakage events (e.g. the first error model with leakage), and identifying corresponding decoding hypergraph hyperedges (e.g., decoding graph edges) that have different weights in each decoding hypergraph.

In step 703, the computing system performing the method of FIG. 7 adjusts one or more weights associated with the determined decoding hypergraph hyperedges affected by the leakage identified in step 701, in accordance with the leakage event (which may include modifying existing data values stored in memory and/or replacing existing data values stored in memory). This can be achieved in various ways, including (but not limited to) setting an error flag or mask (e.g. indicating that the hyperedge is to be included in a cluster/pre-cluster or pre-grown), adding the hyperedge to a mask data structure, modifying one or more hyperedge weight values stored in memory and/or replacing one or more existing hyperedge weight values stored in memory, marking/flagging the hyperedge as having zero weight (so that the decoder treats it as having zero weight, e.g. when using an unweighted hypergraph in which all hyperedges otherwise have the same effective hyperedge weight), merging the nodes connected by the hyperedge, creating a pre-cluster or pre-growing the hyperedge (for decoding algorithms based on clustering) etc.

Adjusting the plurality of decoding hypergraph hyperedges in accordance with the leakage event may therefore comprise setting respective hyperedge weights of each of the determined plurality of decoding hypergraph hyperedges to a predetermined weight value. The predetermined weight value is preferably uniform (e.g. the same weight value used for each of the determined plurality of hypergraph hyperedges). The predetermined weight value is preferably zero, although alternative values may be used provided that they are small relative to other weight values in the decoding hypergraph. Setting a hyperedge weight to zero may involve updating a hyperedge weight value in memory, marking/flagging the hyperedge as having zero weight (so that the decoder treats it as having zero weight, e.g. when using an unweighted hyperedge in which all hyperedge otherwise have the same effective hyperedge weight), merging the nodes connected by the hyperedge, or creating a pre-cluster or pre-growing edges (for decoding algorithms based on clustering).

Adjusting the plurality of decoding hypergraph hyperedges in accordance with the leakage event may comprise uniformly adjusting the plurality of hypergraph hyperedges (e.g. making the same adjustment to each hypergraph hyperedge, such as pre-growing the edge or including the edge in a pre-cluster).

In clustering algorithms, clusters are initialised on each defect. Without pre-clustering, each cluster contains one defect and no edges. Pre-clustering involves expanding these clusters during (or immediately after) initialisation to include additional hyperedges and nodes (e.g. adjacent hyperedges potentially affected by leakage events); the clusters can effectively begin as larger clusters that may contain hyperedges and/or additional nodes.

Pre-growing involves setting the support of certain hyperedges that are to be modified (e.g. hyperedges potentially affected by leakage). Clusters are initialised with single nodes (unlike in pre-clustering), but will expand more quickly over pre-grown hyperedges. In other words, the decoder will include any adjacent pre-grown hyperedges in a cluster in addition to hyperedges that are added as part of the normal growth stage.

Adjusting the plurality of decoding hypergraph hyperedges in accordance with the leakage event may alternatively comprise setting an error flag or mask for each of the determined plurality of decoding hypergraph hyperedges. For example, a bit may be used as an error flag (e.g. a leakage error flag) to indicate that a hyperedge is associated with a leakage event and/or has an increased error probability; the error flag may be stored in hyperedge data in the decoding hypergraph. Setting a mask for each hyperedge may involve adding the hyperedge to a mask data structure (e.g. a list) indicating hyperedges that are associated with leakage events and/or have increased error probabilities.

The error flag or mask may indicate that the hyperedge is to be included in a cluster/pre-cluster (e.g. for use by the decoding system when determining a correction using a clustering algorithm).

One skilled in the art will appreciate that the nature of the adjustment may vary depending upon details such as the type of qubit affected by the leakage event and/or the cause of the leakage event.

References herein to any data associated with a decoding hypergraph or decoding graph (e.g., weights associated with edges or hyperedges) being stored in memory should be understood to encompass storage of said data in any suitable type of memory devices within, or otherwise coupled to, the system performing the method of FIG. 7, such as random-access memory (RAM) modules, read-only memory (ROM) modules, hard disks, and/or other non-transitory computer-readable media.

The resulting modified decoding hypergraph can then be used to decode syndrome data as part of a quantum error correction procedure.

Beyond leakage scenarios discussed above, decoding hypergraph modifications may also be required (among others) in scenarios when heralded erasures are detected, when handling soft information, and when using decoding approaches based on correlated matching. Conventional approaches to implementing changes to decoding hypergraphs are computationally expensive and typically involve generating a new decoding hypergraph to replace an existing decoding hypergraph stored in memory and/or require complicated calculations to determine suitable modifications. Performing such operations during runtime is therefore impossible using conventional techniques because the new decoding hypergraph can not be generated quickly enough to perform error correction. To date, no approaches have been proposed that are technically feasible to implement on dedicated decoding hardware.

Figure 8:
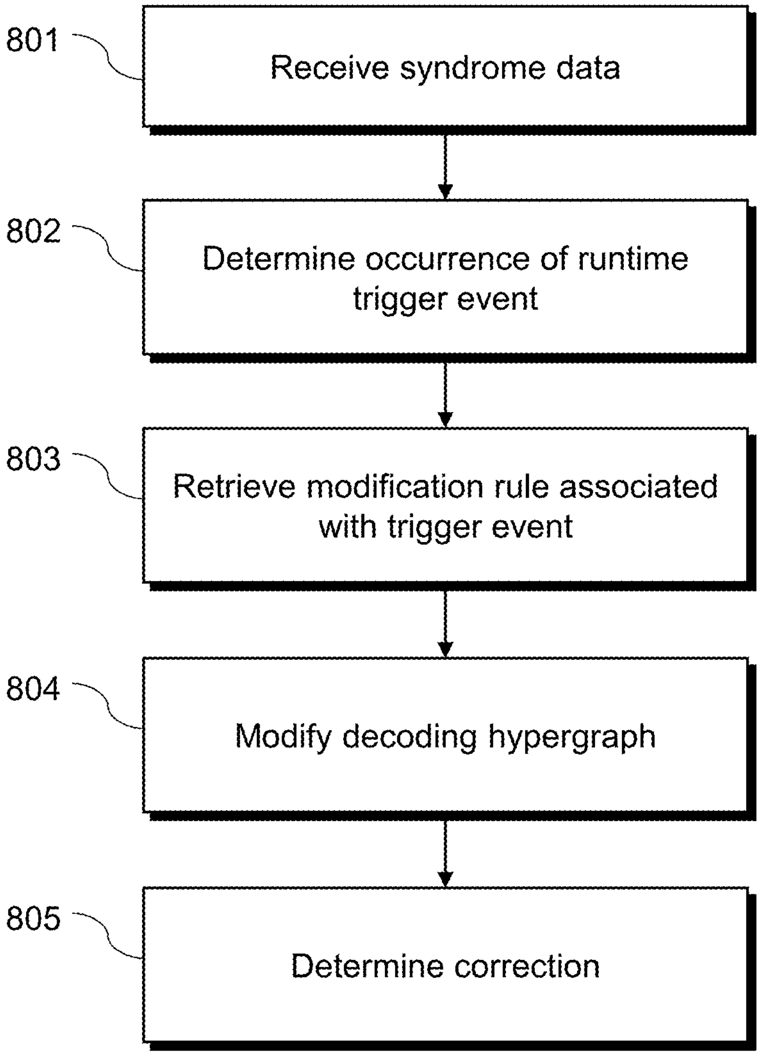
FIG. 8 shows a flowchart of another method of performing a quantum error correction code.

An alternative approach for runtime decoding graph (or hypergraph) modifications is shown in FIG. 8. The method shown in FIG. 8 may be performed by a suitable computing system, such as the decoding system 102 described above in relation to FIG. 1, and can be performed to make runtime modifications to a decoding graph (or hypergraph) in response to various runtime trigger events, including (but not limited to) leakage detection events, control system events, decoder events/outcomes (e.g. if additional information is obtained regarding qubit error states) etc.

In step 801, the computing system performing the method of FIG. 8 receives syndrome data that is representative of an error state of a plurality of quantum devices (e.g. qubits) of a quantum computing system. In step 802, the computing system performing the method of FIG. 8 determines that a runtime trigger event has occurred, and which is associated with at least one quantum device and/or at least one edge (or hyperedge) of the decoding graph (or hypergraph). The runtime trigger event may be any event occurring during runtime of a quantum computation (e.g. during the time in which the quantum computation is performed/running on the quantum computing system) that necessitates modification of the decoding graph (or hypergraph). For example, the runtime trigger event may be a leakage detection event associated with a single qubit. The runtime trigger event may be generated by the decoding system (i.e. internally), or it may be received from another component of the quantum computing system (i.e. external from the decoder), e.g. from the control system.

In step 803, the computing system performing the method of FIG. 8 retrieves a modification rule from a modification map data structure. The modification map data structure comprises a plurality of predefined modification rules, each of which may be associated with a respective runtime trigger event. For instance, the predefined modification rules may be stored in memory prior to initiating a sequence of operations on a plurality of quantum devices (e.g., a quantum circuit), and accessed during runtime (e.g., during the sequence of operations). The modification map data structure and its modification rules may be stored in any memory device, such as random-access memory (RAM) modules, read-only memory (ROM) modules, hard disks, and/or other non-transitory computer-readable media. By generating and storing modification rules prior to execution of a quantum circuit or other sequence of operations, modifications to the decoding hypergraph can be made more quickly than approaches in which modifications are calculated in response to an error syndrome. As such, runtime error correction may be much more feasible when using the pregenerated modification rules as in the method of FIG. 8.

Each modification rule comprises instructions defining decoding hypergraph modifications to be made in response to the respective runtime trigger event; example of modifications include changing hyperedge weights, adding/removing hyperedges/nodes etc.). The modification may be an absolute modification (e.g. may define exactly which hyperedges and/or nodes in the decoding hypergraph should be modified), or it may be a relative modification (e.g. it may define positions of modifications with respect to a given hyperedge, such as the hyperedge associated with the trigger event). Modifications may simply list which hyperedges should be modified, or they may include additional information such as updated hyperedge weights and/or a function that can be used to deduce which hyperedges to modify (thereby negating the need to store specific hyperedge sets). The modification rules may include leakage modification rules determined using the method shown in FIG. 7.

In step 804, the computing system performing the method of FIG. 8 modifies a decoding hypergraph stored in memory on the decoding system, in accordance with the modification rule retrieved in step 803, to generate a modified decoding hypergraph. The original decoding hypergraph may be generated by, or provided to, the decoding system ahead of runtime.

In step 805, a correction is determined for the error state by decoding the syndrome data with the modified decoding hypergraph. The correction may be applied to a logical state measurement at the control system, at the decoding system or at some other subsystem of the quantum computing device, such as a device operating at the algorithmic/application layer of the quantum stack.

The correction may provide the locations of physical qubits affected by errors, such that these qubits can either be corrected during the computation (e.g. by applying a quantum gate to reverse the error) or by tracking the effect of the error using classical processing and correcting any subsequent physical qubit measurements (the latter approach is preferred as there is a risk that performing additional correction operations on the physical qubits could cause further errors). In this case, the correction may be in the form of a binary list indicating physical qubits needing correction.

However, it is generally not necessary to provide the locations of individual physical qubits that are affected by errors. Instead, it suffices to track the effect that the physical qubit errors have upon logical quantum observables (referred to herein as logical observables) of the logical qubits. In quantum computing (and quantum mechanics more generally), an observable is a physical property that can be measured, e.g. the state of a qubit. A logical observable is therefore a logical state of a qubit. Rather than providing a correction at the physical qubit level, the decoder can instead provide a correction at the logical qubit level by providing a single bit for each logical observable of interest indicating whether the value of that logical observable has been affected (e.g., flipped, in the case of qubits) by errors at the physical qubit level. For example, if the logical observable of interest is the logical Pauli Z observable (which corresponds to observing whether a logical qubit is in a $|0\rangle$ or $|1\rangle$ logical state), the correction for that logical qubit may be a single bit, with a zero indicating that the logical observable is not affected by the physical qubit errors (i.e.

measurement of the logical observable will yield a correct value) and a one indicating that the logical observable is affected by the physical qubit errors (in which case the measurement outcome will be incorrect and can be corrected classically, e.g. by changing a $|0\rangle$ measurement outcome to a $|1\rangle$ measurement outcome or vice-versa).

One skilled in the art will appreciate that numerous decoding algorithms can be used depending upon performance requirements and available computing resources, and the methods of the present disclosure (e.g. those illustrated in FIGS. 7 and 8) can be used with any decoding method that utilises a decoding graph (or decoding hypergraph). In addition, one skilled in the art will appreciate that it is generally not necessary to determine error locations and/or apply corrections to the qubits: it suffices to track (classically) how the encoded logical state (or states) of the qubits is affected by errors. The method may optionally further comprise measuring a logical state encoded in the quantum devices and applying the correction to the measured logical state.

Once the correction has been determined, the modification may optionally be reversed (e.g. the decoding hypergraph restored to its unmodified state) so that the decoding hypergraph can be reused for a future round of error correction. Reversing the modification may be achieved in various ways, for example by storing the modification rule and/or original hyperedge weights (e.g. by pushing the original decoding hypergraph weights to a stack) when making the modification and using these to reverse the changes to the decoding hypergraph made during the modification.

The modification map data structure may be stored in memory on the decoding system. The modification map data structure may be generated ahead of runtime (e.g. prior to performing the quantum computation) based on possible runtime trigger events (e.g. leakage), thereby reducing the complexity of calculations that need to be performed at runtime. The time taken to perform a modification using the method of FIG. 8 scales linearly with the number of hyperedges affected by the modification. Using a modification map data structure and modification rules therefore provides a resource-efficient method to account for runtime trigger events (such as leakage), which in turn improves the performance of the decoding system, thereby reducing logical error rates (e.g., reducing noise in the quantum computer).

Data representing graphs, hypergraphs, edges, edge weights, modification map data structures, and other objects described herein may be stored in any suitable way. The illustrative objects shown in the Figures are not intended to limit data structures that store such objects and/or data relating to such objects to any particular form.

Pauli X, Y and Z operations may be referred to herein simply as X, Y and Z operations.

While the present disclosure uses the convention that the qubit measurement outcomes associated with $|0\rangle$ and $|1\rangle$ quantum states are referred to as 0 and 1 respectively (i.e. referring to the states themselves), one skilled in the art will appreciate that the disclosure is equally applicable when using the alternative nomenclature in which these measurement outcomes are referred to as −1 and +1 respectively (i.e. the eigenvalues associated with the $|0\rangle$ and $|1\rangle$ states respectively).

Any method described herein may be provided as a computer program product and/or on one or more computer readable media such as one or more non-transitory computer readable media.

Having thus described several aspects of at least one embodiment of this disclosure, it is to be appreciated that various alterations, modifications, and improvements will readily occur to those skilled in the art. For instance, aspects of the techniques described herein may be combined in any of the following ways:

Example 1. A quantum computing system comprising: a plurality of quantum devices; and a decoding system comprising memory storing a decoding hypergraph associated with a quantum error correction code, the decoding hypergraph comprising a plurality of nodes connected by hyperedges representing error mechanisms associated with the plurality of quantum devices, wherein the quantum computing system is configured to: determine that a leakage event has occurred at a quantum device; determine a plurality of decoding hypergraph hyperedges potentially affected by the leakage event; and adjust the plurality of decoding hypergraph hyperedges in accordance with the leakage event.

Example 2. The quantum computing system of example 1, wherein adjusting the plurality of decoding hypergraph hyperedges comprises setting respective edge weights of each of the determined plurality of decoding hypergraph hyperedges to a predetermined weight value.

Example 3. The quantum computing system of example 2, wherein the predetermined weight value is zero.

Example 4. The quantum computing system of example 1, wherein adjusting the plurality of decoding hypergraph hyperedges comprises setting an error flag or mask for each of the determined plurality of decoding hypergraph hyperedges.

Example 5. The quantum computing system of any preceding example, wherein the decoding system is configured to: receive syndrome data representative of an error state of the plurality of quantum devices; and determine a correction for the error state by decoding the syndrome data with the decoding hypergraph.

Example 6. The quantum computing system of example 5, wherein the quantum computing system comprising is further configured to: measure a logical state encoded in the plurality of quantum devices to obtain a logical state measurement; and apply the correction to the logical state measurement.

Example 7. The quantum computing system of any preceding example, wherein determining the plurality of decoding hypergraph hyperedges potentially affected by the leakage event comprises: determining at least one possible source of the leakage event; determining one or more quantum operations affected by the at least one possible source of the leakage; identifying a plurality of error mechanisms associated with the one or more quantum operations affected by the at least one possible source of the leakage; and identifying a respective decoding hypergraph hyperedge associated with each of the plurality of error mechanisms.

Example 8. The quantum computing system of any of examples 1 to 6, wherein determining the plurality of decoding hypergraph hyperedges potentially affected by the leakage event comprises: generating a first decoding hypergraph for an error model excluding leakage events; generating a second decoding hypergraph for an error model including leakage events; and identifying corresponding hyperedges in the first hypergraph and the second hypergraph that have different edge weights.

Example 9. The quantum computing system of any preceding example, wherein the quantum devices are qubits.

Example 10. The quantum computing system of any preceding example, wherein the decoding hypergraph is a decoding graph and wherein the hyperedges are edges.

Example 11. The quantum computing system of any preceding example, wherein adjusting the plurality of decoding hypergraph hyperedges in accordance with the leakage event comprises uniformly adjusting the plurality of hypergraph hyperedges.

Example 12. A computer-implemented method of performing a quantum error correction code at a quantum computing system comprising a plurality of quantum devices, the quantum error correction code having an associated decoding hypergraph comprising a plurality of nodes connected by hyperedges representing error mechanisms associated with the plurality of quantum devices, the method comprising: determining that a leakage event has occurred at a quantum device; determining a plurality of decoding hypergraph hyperedges potentially affected by the leakage event; and adjusting the plurality of decoding hypergraph hyperedges in accordance with the leakage event.

Example 13. The method of example 12, wherein adjusting the plurality of decoding hypergraph hyperedges comprises setting respective edge weights of each of the determined plurality of decoding hypergraph hyperedges to a predetermined weight value.

Example 14. The method of example 13, wherein the predetermined weight value is zero.

Example 15. The method of example 12, wherein adjusting the plurality of decoding hypergraph hyperedges comprises setting an error flag or mask for each of the determined plurality of decoding hypergraph hyperedges.

Example 16. The method of any of examples 12 to 15, further comprising: receiving syndrome data representative of an error state of the plurality of quantum devices; and determining a correction for the error state by decoding the syndrome data with the decoding hypergraph.

Example 17. The method of example 16, further comprising: measuring a logical state encoded in the plurality of quantum devices to obtain a logical state measurement; and applying the correction to the logical state measurement.

Example 18. The method of any of examples 12 to 17, wherein determining the plurality of decoding hypergraph hyperedges potentially affected by the leakage event comprises: determining at least one possible source of the leakage event; determining one or more quantum operations affected by the at least one possible source of the leakage; identifying a plurality of error mechanisms associated with the one or more quantum operations affected by the at least one possible source of the leakage; and identifying a respective decoding hypergraph hyperedge associated with each of the plurality of error mechanisms.

Example 19. The method of any of examples 12 to 17, wherein determining the plurality of decoding hypergraph hyperedges potentially affected by the leakage event comprises: generating a first decoding hypergraph for an error model excluding leakage events; generating a second decoding hypergraph for an error model including leakage events; and identifying corresponding hyperedges in the first hypergraph and the second hypergraph that have different edge weights.

Example 20. The method of any of examples 12 to 19, wherein the quantum devices are qubits.

Example 21. The method of any of examples 12 to 20, wherein the decoding hypergraph is a decoding graph and wherein the hyperedges are edges.

Example 22. The method of any of examples 12 to 21, wherein adjusting the plurality of decoding hypergraph hyperedges in accordance with the leakage event comprises uniformly adjusting the plurality of hypergraph hyperedges.

Example 23. A computer-readable medium comprising instructions which, when executed by a quantum computing system, cause the quantum computing system to carry out the method of any of examples 12 to 22.

It should be understood that any method of the present disclosure could include additional steps not described herein, and that any device of the present disclosure could include additional components not described herein. In addition, unless indicated otherwise or technically infeasible, the method steps disclosed herein may be performed in alternative orders, and any order described herein should be considered as illustrative rather than limiting. As a non-limiting example, the step of receiving the syndrome data in FIG. 8 need not occur at the start of the process but could occur any time prior to determining the correction. The illustrated steps and components could be split into multiple sub-steps/subcomponents.

The present disclosure may be used with any quantum error correction code that utilises a decoding hypergraph (e.g. a decoding graph), such as a surface code (e.g. planar code) or other topological quantum error correction code.

Aspects of the above-described embodiments of the technology described herein can be implemented in any of numerous ways. For example, aspects of the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Furthermore, one skilled in the art will appreciate that any computation that can be performed by a classical processing device can also be performed by a quantum computing device. Accordingly, any methods or described herein that is performed on a classical computing device (such as a CPU) can also be performed by a quantum processing device, such as a quantum processing unit (QPU) comprising a plurality of qubits.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

What is claimed is:

1. A quantum computing system comprising:

a plurality of quantum devices; and a decoding system comprising memory storing a decoding hypergraph associated with a quantum error correction code, the decoding hypergraph comprising a plurality of nodes connected by hyperedges representing error mechanisms associated with the plurality of quantum devices, wherein the quantum computing system is configured to, during runtime of a quantum computation on the quantum computing system:

determine that a leakage event has occurred at one or more of the plurality of quantum devices;

determine one or more hyperedges of the decoding hypergraph that are associated with an increased likelihood of an error mechanism as a result of the leakage event; and adjust at least one hyperedge of the one or more hyperedges of the decoding hypergraph associated with the increased likelihood of the error mechanism.

2. The quantum computing system of claim 1, wherein adjusting the at least one hyperedge comprises setting respective edge weights of each of the determined one or more hyperedges to a predetermined weight value.

3. The quantum computing system of claim 2, wherein the predetermined weight value is zero.

4. The quantum computing system of claim 1, wherein adjusting the at least one hyperedge comprises setting an error flag or mask for each of the determined one or more hyperedges.

5. The quantum computing system of claim 1, wherein the decoding system is configured to:

receive syndrome data representative of an error state of the plurality of quantum devices; and determine a correction for the error state by decoding the syndrome data with the decoding hypergraph.

6. The quantum computing system of claim 5, wherein the quantum computing system is further configured to:

measure a logical state encoded in the plurality of quantum devices to obtain a logical state measurement; and apply the correction to the logical state measurement.

7. The quantum computing system of claim 1, wherein determining the one or more hyperedges of the decoding hypergraph that are associated with the increased likelihood of the error mechanism comprises:

determining at least one possible source of the leakage event;

determining one or more quantum operations affected by the at least one possible source of the leakage event;

identifying one or more error mechanisms associated with the one or more quantum operations affected by the at least one possible source of the leakage event; and identifying a respective decoding hypergraph hyperedge associated with each of the one or more error mechanisms.

8. The quantum computing system of claim 1, wherein determining the one or more hyperedges of the decoding hypergraph that are associated with the increased likelihood of the error mechanism comprises:

generating a first decoding hypergraph for an error model excluding leakage events;

generating a second decoding hypergraph for an error model including leakage events; and identifying corresponding hypergraph hyperedges in the first decoding hypergraph and the second decoding hypergraph that have different edge weights.

9. The quantum computing system of claim 1, wherein the plurality of quantum devices is a plurality of qubits.

10. The quantum computing system of claim 1, wherein the decoding hypergraph is a decoding graph and wherein the hyperedges are edges.

11. The quantum computing system of claim 1, wherein adjusting the at least one hyperedge of the one or more hyperedges of the decoding hypergraph associated with the increased likelihood of the error mechanism comprises uniformly adjusting the at least one hyperedge of the decoding hypergraph.

12. A computer-implemented method of performing a quantum error correction code at a quantum computing system comprising a plurality of quantum devices, the quantum error correction code having an associated decoding hypergraph comprising a plurality of nodes connected by hyperedges representing error mechanisms associated with the plurality of quantum devices, the method comprising:

determining, during runtime of a quantum computation on the quantum computing system, that a leakage event has occurred at one or more of the plurality of quantum devices;

determining one or more hyperedges of the decoding hypergraph that are associated with an increased likelihood of an error mechanism as a result of the leakage event; and adjusting at least one hyperedge of the one or more hyperedges of the decoding hypergraph associated with the increased likelihood of the error mechanism.

13. The method of claim 12, wherein adjusting the at least one hyperedge comprises setting respective edge weights of each of the determined one or more hyperedges to a predetermined weight value.

14. The method of claim 13, wherein the predetermined weight value is zero.

15. The method of claim 12, wherein adjusting the at least one hyperedge comprises setting an error flag or mask for each of the determined one or more hyperedges.

16. The method of claim 12, further comprising:

receiving syndrome data representative of an error state of the plurality of quantum devices; and determining a correction for the error state by decoding the syndrome data with one or more hyperedges of the decoding hypergraph.

17. The method of claim 16, further comprising:

measuring a logical state encoded in the plurality of quantum devices to obtain a logical state measurement; and applying the correction to the logical state measurement.

18. The method of claim 12, wherein determining the one or more hyperedges of the decoding hypergraph that are associated with the increased likelihood of the error mechanism comprises:

determining at least one possible source of the leakage event;

determining one or more quantum operations affected by the at least one possible source of the leakage event;

identifying one or more error mechanisms associated with the one or more quantum operations affected by the at least one possible source of the leakage event; and identifying a respective decoding hypergraph hyperedge associated with each of the one or more error mechanisms.

19. The method of claim 12, wherein determining the one or more hyperedges of the decoding hypergraph that are associated with the increased likelihood of the error mechanism comprises:

generating a first decoding hypergraph for an error model excluding leakage events;

generating a second decoding hypergraph for an error model including leakage events; and identifying corresponding hypergraph hyperedges in the first decoding hypergraph and the second decoding hypergraph that have different edge weights.

20. The method of claim 12, wherein the plurality of quantum devices is a plurality of qubits.

21. The method of claim 19, wherein the first decoding hypergraph is a decoding graph and wherein the corresponding hypergraph hyperedges identified in the first decoding hypergraph are edges.

22. The method of claim 12, wherein adjusting the at least one hyperedge of the one or more hyperedges of the decoding hypergraph associated with the increased likelihood of the error mechanism comprises uniformly adjusting the at least one hyperedge of the decoding hypergraph.

23. At least one non-transitory computer-readable medium comprising instructions which, when executed by a quantum computing system, cause the quantum computing system to carry out a method of performing a quantum error correction code at a quantum computing system comprising a plurality of quantum devices, the quantum error correction code having an associated decoding hypergraph comprising a plurality of nodes connected by hyperedges representing error mechanisms associated with the plurality of quantum devices, the method comprising:

determining, during runtime of a quantum computation on the quantum computing system, that a leakage event has occurred at one or more of the plurality of quantum devices;

determining one or more hyperedges of the decoding hypergraph that are associated with an increased likelihood of an error mechanism as a result of the leakage event; and adjusting at least one hyperedge of the one or more hyperedges of the decoding hypergraph associated with the increased likelihood of the error mechanism.

* * * * *